US012300908B2

(12) United States Patent
Li et al.

(10) Patent No.: US 12,300,908 B2
(45) Date of Patent: May 13, 2025

(54) MULTI-BAND ANTENNA SYSTEM AND BASE STATION

(71) Applicant: HUAWEI TECHNOLOGIES CO., LTD., Guangdong (CN)

(72) Inventors: Jianping Li, Dongguan (CN); Bing Luo, Shenzhen (CN); Weihong Xiao, Dongguan (CN); Wenfang Li, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 18/173,965

(22) Filed: Feb. 24, 2023

(65) Prior Publication Data

US 2023/0216205 A1 Jul. 6, 2023

Related U.S. Application Data

(63) Continuation of application No. PCT/CN2021/109718, filed on Jul. 30, 2021.

(30) Foreign Application Priority Data

Aug. 24, 2020 (CN) ......................... 202010856708.2

(51) Int. Cl.

*H01Q 5/42* (2015.01)
*H01Q 1/24* (2006.01)

(Continued)

(52) U.S. Cl.

CPC ............... *H01Q 5/42* (2015.01); *H01Q 1/246* (2013.01); *H01Q 1/50* (2013.01); *H01Q 1/521* (2013.01);

(Continued)

(58) Field of Classification Search

CPC H01Q 1/246; H01Q 1/36; H01Q 1/42; H01Q 1/50; H01Q 1/521; H01Q 1/523;

(Continued)

(56) References Cited

U.S. PATENT DOCUMENTS 5,557,292 A 9/1996 Nygren et al.
5,917,458 A 6/1999 Ho et al.

(Continued)

FOREIGN PATENT DOCUMENTS

CN 102403572 A 4/2012
CN 104852158 A 8/2015

(Continued)

OTHER PUBLICATIONS

Office Action in Indian Appln. No. 202337012314, mailed on Feb. 15, 2024, 7 pages (with English translation).

(Continued)

*Primary Examiner* — Robert Karacsony
(74) *Attorney, Agent, or Firm* — Fish & Richardson P.C.

(57) ABSTRACT

This application describes multi-band antenna systems and base stations. An example multi-band antenna system includes: a plurality of radiating element arrays, feeding networks separately corresponding to the plurality of radiating element arrays, at least one layer of a frequency selective surface (FSS), and a reflection panel. The plurality of radiating element arrays are located above the reflection panel. All or some of the plurality of radiating element arrays are stacked. The at least one layer of the FSS is located between the stacked radiating element arrays. A feeding network corresponding to at least one radiating element array in the stacked radiating element arrays is electrically connected to the at least one layer of the FSS, or (Continued)

the feeding network corresponding to the at least one radiating element array is integrated on the at least one layer of the FSS.

18 Claims, 11 Drawing Sheets

(51) Int. Cl.
*H01Q 1/50* (2006.01)
*H01Q 1/52* (2006.01)
*H01Q 5/45* (2015.01)
*H01Q 15/00* (2006.01)
*H01Q 19/10* (2006.01)
*H01Q 1/42* (2006.01)

(52) U.S. Cl.
CPC ........... *H01Q 5/45* (2015.01); *H01Q 15/0026* (2013.01); *H01Q 19/108* (2013.01); *H01Q 1/42* (2013.01)

(58) Field of Classification Search
CPC ........ H01Q 5/42; H01Q 5/45; H01Q 15/0026; H01Q 15/0013; H01Q 15/14; H01Q 17/00; H01Q 19/10; H01Q 19/104; H01Q 19/108; H01Q 21/0006; H01Q 21/0075; H01Q 21/28; H01Q 21/30
See application file for complete search history.

(56) References Cited

U.S. PATENT DOCUMENTS

| | | | |
|---|---|---|---|
| 6,239,750 B1 | 5/2001 | Snygg | |
| 2005/0030137 A1 | 2/2005 | McKinzie et al. | |
| 2009/0002240 A1 | 1/2009 | Sievenpiper et al. | |
| 2014/0097995 A1 | 4/2014 | McKinzie, III | |
| 2018/0175509 A1 | 6/2018 | Saberin et al. | |
| 2018/0269577 A1* | 9/2018 | Kosaka | H01Q 5/48 |
| 2019/0081411 A1 | 3/2019 | Isom et al. | |

FOREIGN PATENT DOCUMENTS

| | | | |
|---|---|---|---|
| CN | 107331952 | A | 11/2017 |
| CN | 108110428 | A | 6/2018 |
| CN | 108539383 | A | 9/2018 |
| CN | 109004370 | A | 12/2018 |
| CN | 109473769 | A | 3/2019 |
| CN | 109524796 | A | 3/2019 |
| CN | 109786976 | A | 5/2019 |
| JP | 3462102 | B2 | 11/2003 |
| KR | 20130131620 | A | 12/2013 |
| KR | 20160032144 | A | 3/2016 |
| WO | 2018039053 | A1 | 3/2018 |
| WO | 2018076491 | A1 | 5/2018 |

OTHER PUBLICATIONS

Office Action in Japanese Appln. No. 2023-513234, mailed on Jun. 17, 2024, 12 pages (with English translation).
Zhu et al., "Integration of 5G Rectangular MIMO Antenna Array and GSM Antenna for Dual-Band Base Station Applications," IEEE Access, vol. 8, Mar. 30, 2020, 13 pages.
Ren et al., "Multi-layer Frequency Selective Surface for Antenna of Unmanned Combat Aerial Vehicles," Telecommunication Engineering, vol. 57, No. 7, Jul. 2017, 4 pages (with English Abstract).
International Search Report and Written Opinion in International Appln. No. PCT/CN2021/109718, mailed on Oct. 21, 2021, 17 pages (with English translation).
Extended European Search Report in European Appln No. 21860046.8, dated Dec. 20, 2023, 5 pages.
Office Action in Korean Appln. No. 10-2023-7008924, mailed on Oct. 28, 2024, 5 pages (with English translation).

* cited by examiner

MULTI-BAND ANTENNA SYSTEM AND BASE STATION

CROSS-REFERENCE TO RELATED APPLICATIONS

This application is a continuation of International Application No. PCT/CN2021/109718, filed on Jul. 30, 2021, which claims priority to Chinese Patent Application No. 202010856708.2, filed on Aug. 24, 2020. The disclosures of the aforementioned applications are hereby incorporated by reference in their entireties.

TECHNICAL FIELD

This application relates to the field of communication technologies, and more specifically, to a multi-band antenna system and a base station.

BACKGROUND

A base station antenna is a basis of current mobile communication, and plays an important role in mobile communication. A communication system with a higher rate and a larger capacity needs to be designed to meet increasing requirements of people for a mobile communication rate and a bandwidth. A base station antenna system currently evolves from a fourth-generation (4th-generation, 4G) mobile communication technology to a fifth-generation (5th-generation, 5G) mobile communication technology. The base station antenna includes a passive antenna and an active antenna, and the active antenna may be, for example, a massive multiple-input multiple-output (massive MIMO) antenna. Currently, a key technology is that an active-passive integrated antenna panel resolution is provided for an operator. Multi-band antenna integration and the like are key technologies in an antenna system.

Therefore, currently, a multi-band antenna system needs to be provided urgently.

SUMMARY

This application provides a multi-band antenna system and a base station, to implement a multi-band architecture layout with good system performance.

According to a first aspect, a multi-band antenna system is provided, including: a plurality of radiating element arrays, feeding networks separately corresponding to the plurality of radiating element arrays, a frequency selective surface FSS, and a reflection panel, where the plurality of radiating element arrays are located above the reflection panel when the reflection panel is horizontally placed, and all or some of the plurality of radiating element arrays are stacked; the FSS is located between the stacked radiating element arrays; and a feeding network corresponding to at least one radiating element array in the stacked radiating element arrays is electrically connected to the FSS, or a feeding network corresponding to at least one of the stacked radiating element arrays is integrated on the FSS.

That “the FSS is located between the stacked radiating element arrays” may include a plurality of possible implementations. For example, there are two adjacent stacked radiating element arrays, and one layer of the FSS or a plurality of layers of the FSS may be disposed between the two radiating element arrays. For another example, one layer of the FSS or a plurality of layers of the FSS are disposed between every two adjacent stacked radiating element arrays. It should be understood that the plurality of layers of the FSS are stacked adjacent to each other.

That “a feeding network corresponding to at least one radiating element array is electrically connected to the FSS” may also include a plurality of possible implementations. For example, when there is one layer of the FSS, a feeding network corresponding to one radiating element array may be electrically connected to the FSS, or a feeding network corresponding to a plurality of radiating element arrays may be electrically connected to the FSS. When there are a plurality of layers of the FSS, a feeding network corresponding to one radiating element array may be electrically connected to one of the layers of the FSS, or a feeding network corresponding to a plurality of radiating element arrays may be electrically connected to one of the layers of the FSS.

The feeding network may be located above or below the reflection panel. This is not limited in this embodiment of this application.

In the multi-band antenna system in this embodiment of this application, at least one layer of the FSS is added between the stacked radiating element arrays, thereby reducing an impact of an induced current generated by the feeding network on each radiating element array, and improving performance of the multi-band antenna system. Specifically, the FSS presents a passband characteristic to an operating frequency of an antenna, so that an electromagnetic wave radiated by the antenna can well pass through the FSS, thereby reducing an impact of the feeding network on the electromagnetic wave radiated by the antenna. It should be understood that the feeding network is integrated with the FSS, so that the feeding network is a part of the FSS. Therefore, the upper feeding network does not affect electromagnetic radiation of the antenna.

With reference to the first aspect, in some implementations of the first aspect, there is one layer of the FSS or there are a plurality of layers of the FSS, and when there are a plurality of layers of the FSS, that a feeding network corresponding to at least one radiating element array is electrically connected to the FSS includes: The feeding network corresponding to the at least one radiating element array is electrically connected to at least one layer of the layers of the FSS; or that a feeding network corresponding to the at least one radiating element array is integrated on the FSS includes: The feeding network corresponding to the at least one radiating element array is integrated on at least one layer of the layers of the FSS.

With reference to the first aspect, in some implementations of the first aspect, frequency bands separately corresponding to the plurality of radiating element arrays include at least two different frequency bands. In a possible design, the different frequency bands may include a frequency band corresponding to a 4G antenna and a frequency band corresponding to a 5G antenna.

With reference to the first aspect, in some implementations of the first aspect, an electrical connection manner is any one of a direct current connection manner, a coupling connection manner, or a segmented direct current connection manner.

With reference to the first aspect, in some implementations of the first aspect, the feeding network includes a cable.

With reference to the first aspect, in some implementations of the first aspect, at least a part of the cable is parallel to the FSS.

With reference to the first aspect, in some implementations of the first aspect, the feeding network is of a microstrip structure, or the feeding network includes a microstrip.

With reference to the first aspect, in some implementations of the first aspect, the FSS includes a first FSS, and in the plurality of radiating element arrays, a radiating element array located at an upper layer of the first FSS and a radiating element array located at a lower layer of the first FSS are respectively disposed in different radomes. This is more conducive to antenna mounting and subsequent upgrading.

It should be understood that the first FSS herein refers to any one of the at least one layer of the FSS, and is not intended to limit a protection scope of this embodiment of this application. In another possible implementation, the multi-band antenna system may include more radomes to implement a protection function. This is not limited in this embodiment of this application.

With reference to the first aspect, in some implementations of the first aspect, the FSS includes the first FSS, and radiating element arrays located at the upper layer of the first FSS include a plurality of radiating element arrays separately corresponding to at least two different frequency bands and/or radiating element arrays located at the lower layer of the first FSS include a plurality of radiating element arrays separately corresponding to at least two different frequency bands.

With reference to the first aspect, in some implementations of the first aspect, at least one layer of the FSS is an FSS with a grid.

According to a second aspect, a base station is provided. The base station includes the multi-band antenna system in the first aspect or any implementation of the first aspect and a radio frequency module, where the radio frequency module is connected to the multi-band antenna system.

DESCRIPTION OF EMBODIMENTS

Figure 1:
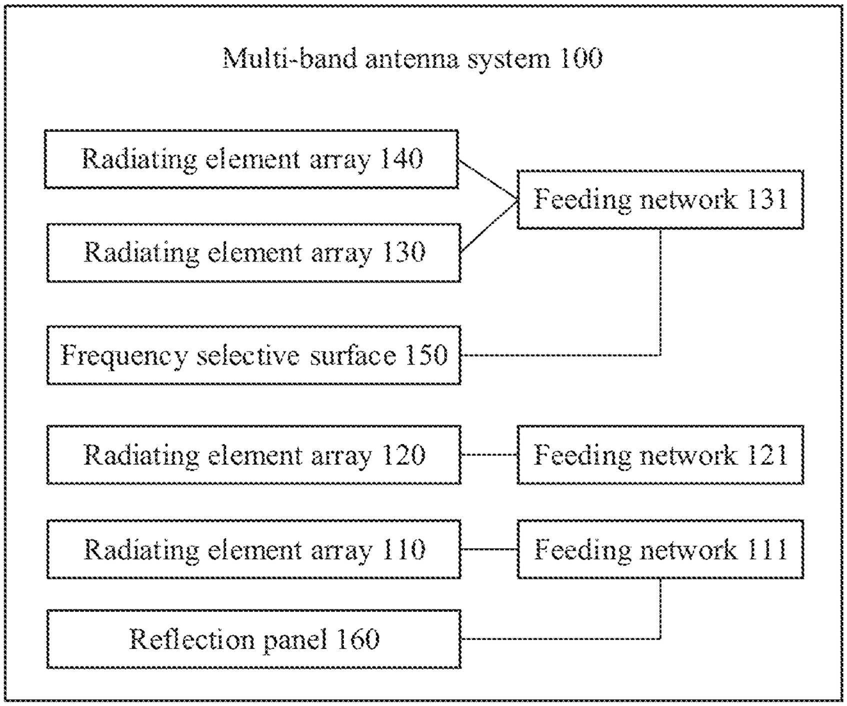
FIG. 1 is a schematic diagram of a multi-band antenna system according to an embodiment of this application.

The following describes technical solutions of embodiments in this application with reference to accompanying drawings.

The technical solutions in embodiments of this application may be applied to various communication systems, for example, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a fifth-generation (5th generation, 5G) system or new radio (new radio, NR), a device-to-device (device to device, D2D) system, and a vehicle to everything (vehicle to everything, V2X) system.

First, terms in embodiments of this application are briefly described.

1. Antenna

An antenna may include one or more of a radiating element, a reflection panel (or referred to as a base plate or an antenna panel), a feeding network (or referred to as a power distribution network), and a radome. The radiating element of the antenna may include an antenna element. The antenna element may be referred to as an element for short, and has functions of guiding and amplifying an electromagnetic wave.

The feeding network implements a feeding function, where feeding means power supply. In the field of antennas, feeding may be referred to as supplying power to the antenna or providing energy. A function of the feeding network is to feed a signal to each radiating element of the antenna based on a specific amplitude and a specific phase, or feed, to a signal processing element of a base station based on a specific amplitude and a specific phase, a signal received from each radiating element. The feeding network usually includes a controlled impedance transmission line, and the feeding network may include devices such as a phase shifter.

2. Frequency Selective Surface (Frequency Selective Surface, FSS)

An FSS is of a two-dimensional periodic array structure, and can effectively control transmission and reflection of an incident electromagnetic wave. The FSS may be a spatial filter, and interaction between the FSS and an electromagnetic wave presents an obvious band-pass or band-stop filtering characteristic. The FSS has a specific frequency selection function. There are usually two types of FSS: One type of FSS is transmissive to an incident wave in a resonance case, and the other type of FSS is reflective to an incident wave in a resonance case.

3. Base Station

A base station in embodiments of this application may be a device configured to communicate with a terminal device, including a base transceiver station (base transceiver station, BTS) in a global system for mobile communications (global system for mobile communications, GSM) or code division multiple access (code division multiple access, CDMA), may be a NodeB (NodeB, NB) in a wideband code division multiple access (wideband code division multiple access, WCDMA) system, may be an evolved NodeB (evolved NodeB, eNB or eNodeB) in an LTE system, or may be a wireless controller in a cloud radio access network (cloud radio access network, CRAN) scenario. Alternatively, the base station may include a relay, an access point, a vehicle-mounted device, a wearable device, a base station in a future 5G network, a base station in a future evolved public land mobile network (public land mobile network, PLMN), or the like. This is not limited in embodiments of this application.

A base station antenna is an important component of a base station. With evolution of a base station antenna system, a multi-band antenna system currently already becomes a research focus.

In a design of the multi-band antenna system, when an antenna is horizontally placed (for example, a reflection panel of the antenna is horizontally placed), both a radiating element array of one or more frequency bands and a feeding network of the radiating element array are located above a radiating element array of another frequency band. An induced current on an upper cable is inductively coupled to a lower radiating element array, to excite the induced current. This has a large impact on a radiating element array of each frequency band, for example, an antenna pattern is distorted or an antenna pattern is resonated.

In view of this, this application provides a new multi-band antenna system, to implement a multi-band architecture layout with good system performance.

FIG. 1 is a schematic diagram of a multi-band antenna system 100 according to an embodiment of this application. The multi-band antenna system 100 includes four radiating element arrays (a radiating element array 110, a radiating element array 120, a radiating element array 130, and a radiating element array 140), three feeding networks (a feeding network 111, a feeding network 121, and a feeding network 131) corresponding to the four radiating element arrays, a frequency selective surface frequency selective surface (FSS) 150, and a reflection panel 160.

In this embodiment of this application, the radiating element arrays may be in a many-to-one relationship or a one-to-one relationship with the feeding networks. This is not limited in this embodiment of this application. As shown in FIG. 1, the radiating element array 110 corresponds to the feeding network 111, the radiating element array 120 corresponds to the feeding network 121, and both the radiating element array 130 and the radiating element array 140 correspond to the feeding network 131. The radiating element array may be electrically connected to a feeding network corresponding to the radiating element array. For example, the radiating element array 110 is electrically connected to the feeding network 111, the radiating element array 120 is electrically connected to the feeding network 121, and both the radiating element array 130 and the radiating element array 140 are electrically connected to the feeding network 131.

When the reflection panel 160 is horizontally placed, the four radiating element arrays are located above the reflection panel 160, and the four radiating element arrays are stacked. It should be noted that, for a stacking manner in this embodiment of this application, refer to a placement manner of the four radiating elements arrays in FIG. 1: As shown in FIG. 1, the radiating element array 110, the radiating element array 120, the radiating element array 130, and the radiating element array 140 are stacked from bottom to top. In a possible design, planes corresponding to the radiating element arrays are parallel to each other.

The three feeding networks may be separately located above the reflection panel 160, or may be located below the reflection panel 160. In a possible design, the feeding network 111 may pass through the reflection panel 160 and be located below the reflection panel 160, and the feeding network 121 and the feeding network 131 may be located above the reflection panel 160. This is not limited in this embodiment of this application.

In the multi-band antenna system 100, the FSS 150 is disposed and located between the radiating element array 120 and the radiating element array 130. The feeding network 131 corresponding to the radiating element array 130 is electrically connected to the FSS 150. Optionally, a feeding network corresponding to another radiating element array may alternatively be electrically connected to the FSS 150. For example, the feeding network 121 corresponding to the radiating element array 120 may alternatively be electrically connected to the FSS 150, which is not shown in FIG. 1. The FSS 150 needs to be electrically connected to at least one of the feeding networks corresponding to the four radiating element arrays, so that the feeding network connected to the FSS 150 is grounded. In a product implementation, the FSS 150 is more easily connected to a feeding network corresponding to a radiating element array located above the FSS 150.

The FSS is added between the stacked radiating element arrays (the radiating element array 120 and the radiating element array 130), thereby reducing an impact of an induced current generated by the feeding network on each radiating element array. Specifically, the FSS presents a passband characteristic to an operating frequency of an antenna, so that an electromagnetic wave radiated by the antenna located below the FSS can well pass through the FSS, thereby reducing an impact of the feeding network on performance of the electromagnetic wave radiated by the antenna. It should be understood that the feeding network is integrated with the FSS, so that the feeding network is a part of the FSS. Therefore, the upper feeding network does not affect electromagnetic radiation of the antenna.

Figure 2:
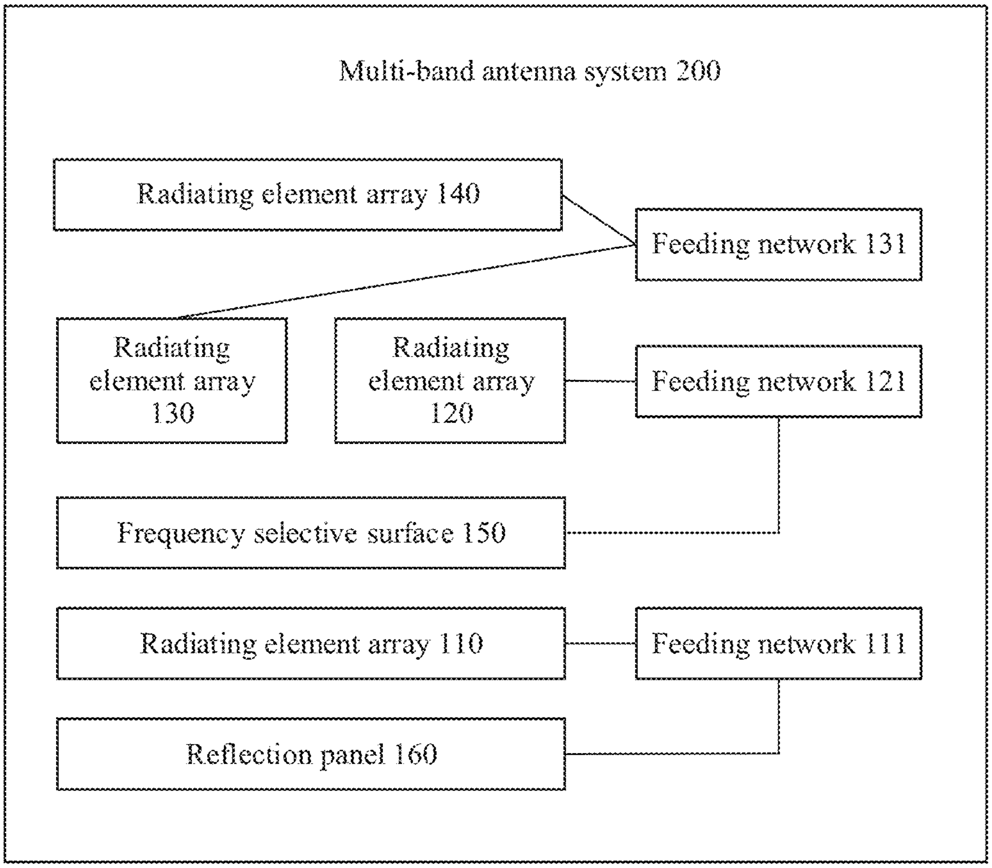
FIG. 2 is a schematic diagram of another multi-band antenna system according to an embodiment of this application.

It should be noted that all the technical solutions in this embodiment of this application may be applied to a scenario in which the reflection panel is horizontally placed. Details are not described below again. FIG. 1 shows only a possible design. The multi-band antenna system in this application may alternatively be designed as a plurality of other structures. FIG. 2 shows another multi-band antenna system 200 according to this application. In FIG. 2, a radiating element array 120, a radiating element array 130, and a radiating element array 140 may be placed above a radiating element array 110. However, the radiating element array 120 and the radiating element array 130 are placed at one layer. In other words, the radiating element array 120 and the radiating element array 130 are not stacked. An FSS 150 is located between the radiating element array 110 and both of the radiating element array 120 and the radiating element array 130. The FSS 150 may be electrically connected to a feeding network 121, may be electrically connected to a feeding network 131, or may be electrically connected to a feeding network 121 and a feeding network 131. This is not limited in this embodiment of this application. For other details of FIG. 2, refer to the description of FIG. 1. Details are not described herein again.

All of a plurality of radiating element arrays in the multi-band antenna system may be stacked (as shown in FIG. 1) or some of a plurality of radiating element arrays in the multi-band antenna system may be stacked (as shown in FIG. 2). This is not limited in this embodiment of this application. It should be understood that, in this embodiment of this application, the four radiating element arrays are merely used as an example for description. However, the multi-band antenna system may alternatively have another quantity of radiating element arrays, for example, two radiating element arrays, and the two radiating element arrays are respectively located above and below the FSS. This is not limited in this embodiment of this application.

In FIG. 1 and FIG. 2, one layer of FSS 150 is merely used for description. In another possible design, the multi-band antenna system in this embodiment of this application may include a plurality of layers of the FSS. The following performs description by using examples with reference to FIG. 3 and FIG. 4.

Figure 3:
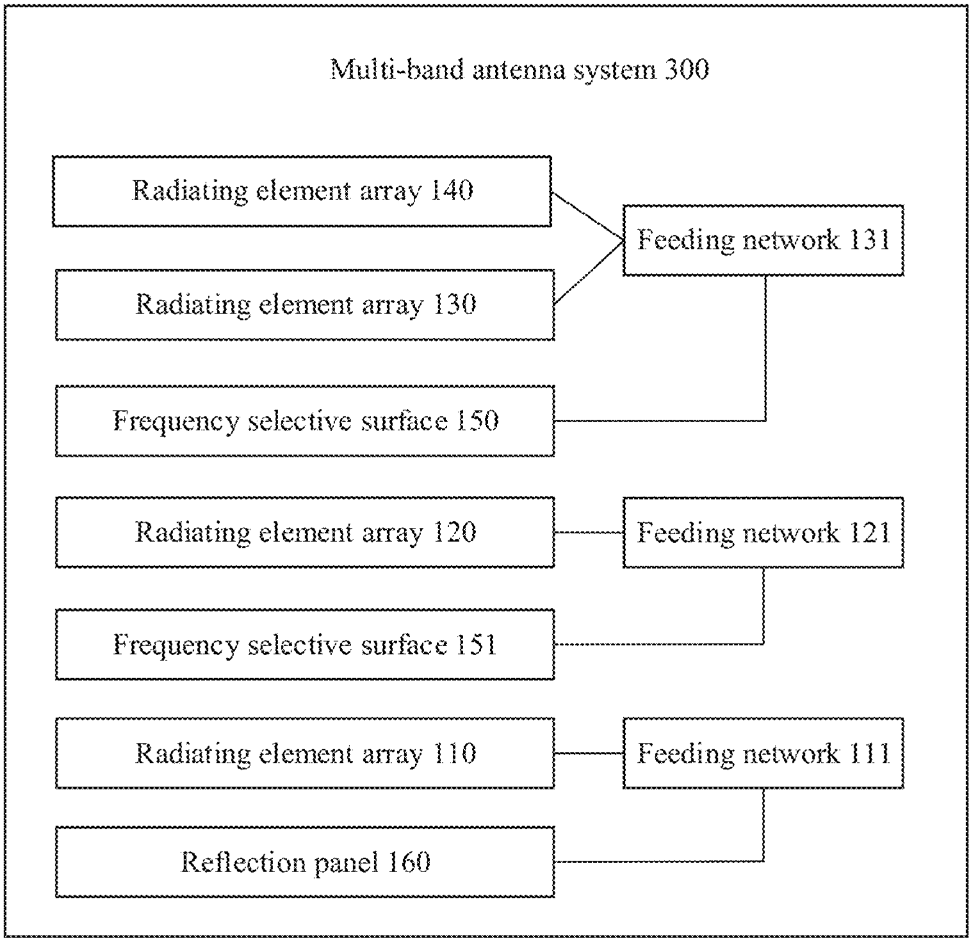
FIG. 3 is a schematic diagram of another multi-band antenna system according to an embodiment of this application.

FIG. 3 shows another multi-band antenna system 300 according to this application, including an FSS 150 and an FSS 151, where a radiating element array 110, a radiating element array 120, a radiating element array 130, and a radiating element array 140 are stacked from bottom to top, the FSS 151 is located between the radiating element array 110 and the radiating element array 120, and the FSS 150 is located between the radiating element array 120 and the radiating element array 130. A feeding network 121 corresponding to the radiating element array 120 is electrically connected to the FSS 151. A feeding network 131 corresponding to the radiating element array 130 is electrically connected to the FSS 150.

Alternatively, the feeding network 121 corresponding to the radiating element array 120 may also be electrically connected to the FSS 150. In other words, both the feeding network 121 and the feeding network 131 are electrically connected to the FSS 150, which is not shown in the figure. However, this is not limited in this embodiment of this application.

Optionally, one layer of the FSS may be further disposed between the radiating element array 130 and the radiating element array 140, which is not shown in FIG. 3. For other details of FIG. 3, refer to the description of FIG. 1. Details are not described herein again.

Figure 4:
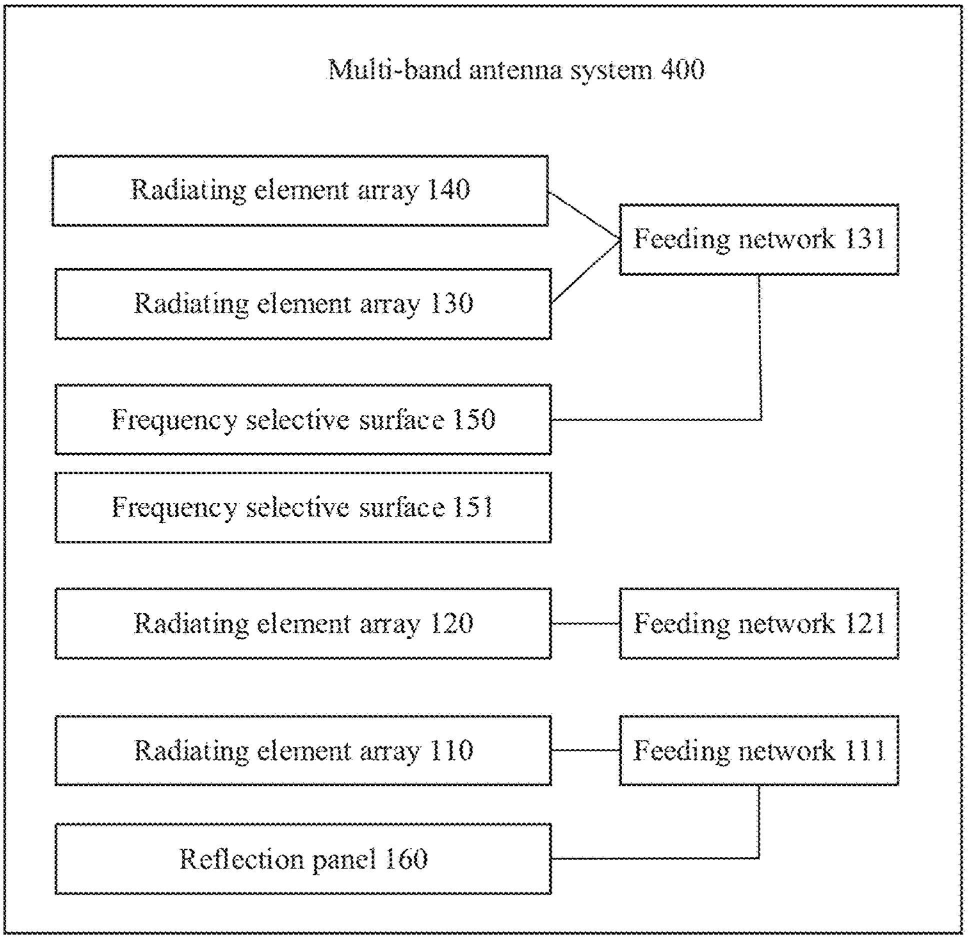
FIG. 4 is a schematic diagram of another multi-band antenna system according to an embodiment of this application.

FIG. 4 shows another multi-band antenna system 400 according to this application, including an FSS 150 and an FSS 151, where a radiating element array 110, a radiating element array 120, a radiating element array 130, and a radiating element array 140 are stacked from bottom to top, and both the FSS 150 and the FSS 151 are located between the radiating element array 120 and the radiating element array 130, that is, the FSS 150 and the FSS 151 are adjacent to each other and stacked. Disposition of a plurality of layers of the FSS is more conducive to reducing an impact of an induced current generated by a feeding network on each radiating element array. A feeding network 131 corresponding to the radiating element array 130 is electrically connected to the FSS 150.

Alternatively, the feeding network 131 may also be electrically connected to the FSS 151. In other words, the feeding network 131 is electrically connected to the FSS 150 and the FSS 151. Alternatively, the feeding network 131 is electrically connected to the FSS 150, and a feeding network 121 is electrically connected to the FSS 151, which is not shown in the figure. However, this is not limited in this embodiment of this application.

Optionally, at least one layer of the FSS may be further disposed between the radiating element array 110 and the radiating element array 120, and at least one layer of the FSS may also be further disposed between the radiating element array 130 and the radiating element array 140, which is not shown in FIG. 4. For other details of FIG. 4, refer to the description of FIG. 1. Details are not described herein again.

In this embodiment of this application, a plurality of layers of the FSS may be disposed between any two adjacent radiating element arrays in the four radiating element arrays. This is more conducive to reducing an impact of an induced current generated by the feeding network on each radiating element array.

In conclusion, at least one layer of the FSS may be disposed between any two adjacent radiating element arrays in the stacked radiating element arrays in this embodiment of this application, and a feeding network corresponding to at least one radiating element array is electrically connected to the at least one layer of the FSS, thereby reducing the impact of the induced current generated by the feeding network on each radiating element array, and improving performance of the multi-band antenna system.

Optionally, the plurality of radiating element arrays separately correspond to at least two different frequency bands. For example, the radiating element array 110 corresponds to a first frequency band, and the radiating element array 120 corresponds to a second frequency band. The first frequency band and the second frequency band are not equal.

Figure 5:
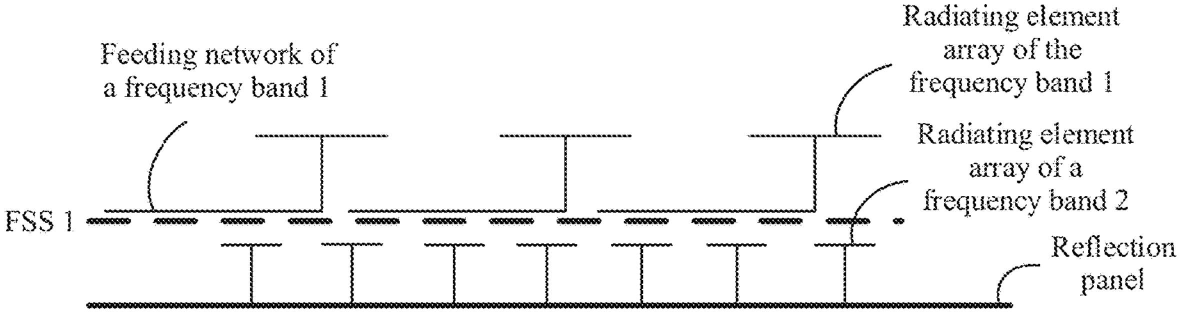
FIG. 5 is a schematic diagram of another multi-band antenna system according to an embodiment of this application.

An antenna system of two frequency bands is used as an example. FIG. 5 is a schematic diagram of another multi-band antenna system according to an embodiment of this application. In FIG. 5, a radiating element array of a frequency band 2 is located above a reflection panel, an FSS 1 is located above the radiating element array of the frequency band 2, and a radiating element array of a frequency band 1 is located above the FSS 1. In other words, the FSS 1 is located between the radiating element array of the frequency band 1 and the radiating element array of the frequency band 2. A feeding network corresponding to a radiating element array of the frequency band 1 may be referred to as a feeding network of the frequency band 1 for short, and the feeding network of the frequency band 1 is electrically connected to the FSS 1.

Figure 6:
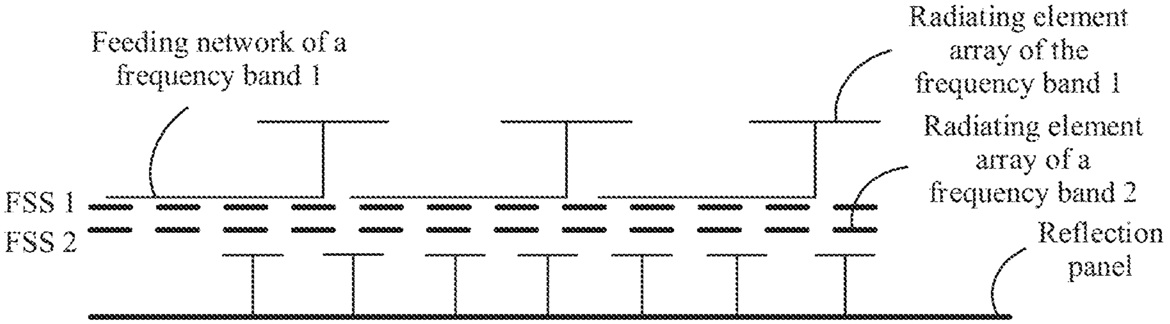
FIG. 6 is a schematic diagram of another multi-band antenna system according to an embodiment of this application.

FIG. 6 is a schematic diagram of another multi-band antenna system. The multi-band antenna system includes an FSS 1 and an FSS 2, and the FSS 1 and the FSS 2 are stacked, and are located between a radiating element array of a frequency band 1 and a radiating element array of a frequency band 2. A feeding network of the frequency band 1 is electrically connected to the FSS 1.

In a possible design, the frequency band 1 is a frequency band corresponding to a 4G antenna, and the frequency band 2 is a frequency band corresponding to a 5G antenna. However, this is not limited in this embodiment of this application.

Figure 7:
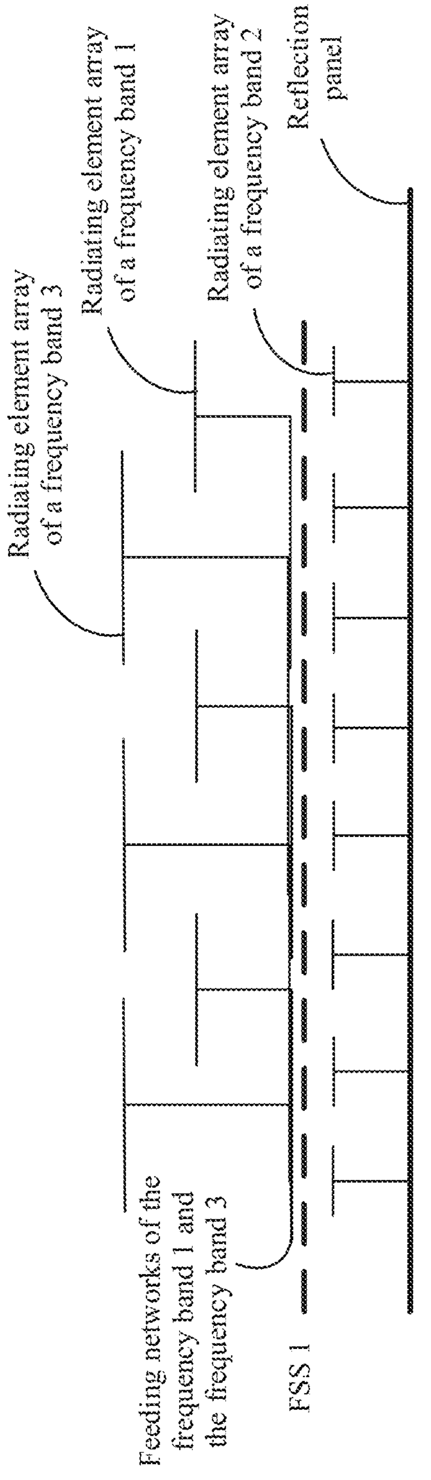
FIG. 7 is a schematic diagram of another multi-band antenna system according to an embodiment of this application.

An antenna system of three frequency bands is used as an example. FIG. 7 is a schematic diagram of another multi-band antenna system according to an embodiment of this application. In FIG. 7, a radiating element array of a frequency band 2 is located above a reflection panel, an FSS 1 is located above the radiating element array of the frequency band 2, and a radiating element array of a frequency band 1 and a radiating element array of a frequency band 3 are located above the FSS 1. The radiating element array of the frequency band 1 and the radiating element array of the frequency band 3 are located at a same layer. A feeding network corresponding to a radiating element array of the frequency band 1 may be referred to as a feeding network of the frequency band 1 for short, and a feeding network corresponding to a radiating element array of the frequency band 3 may be referred to as a feeding network of the frequency band 3 for short. The feeding network of the frequency band 1 and the feeding network of the frequency band 3 are electrically connected to the FSS 1. In a possible design, the radiating element array of the frequency band 1 and the radiating element array of the frequency band 3 may be fed by a common feeding network, and the common feeding network is electrically connected to the FSS 1. In FIG. 5 to FIG. 7, the FSS 1 (and the FSS 2) may transmit an electromagnetic wave radiated by the array of the frequency band 2, and reflect at least a part of an electromagnetic wave radiated by the array of the frequency band 1, thereby reducing an impact of an induced current generated by the feeding network on each radiating element array.

Figure 8:
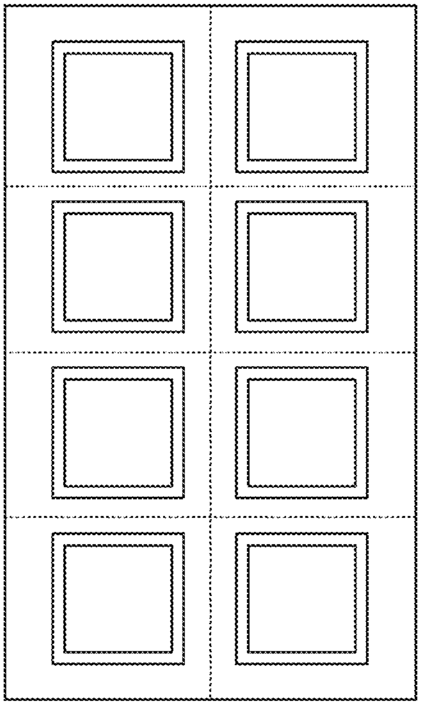
FIG. 8 is a schematic diagram of an FSS with a grid.

Optionally, the FSS in this embodiment of this application is an FSS with a grid, for example, a band-pass FSS, as shown in FIG. 8. An equivalent circuit of the band-pass FSS is a parallel resonant cable, a resonant point is open-circuited, and a radiated electromagnetic wave corresponding to the resonant point is fully transmitted at the resonant point. The FSS may be of any structure that has a transmission function. This is not limited in this embodiment of this application.

Figure 9:
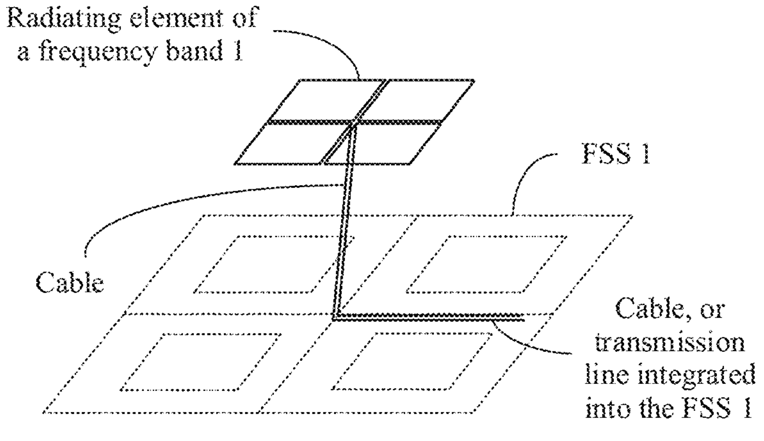
FIG. 9 is a schematic diagram in which a radiating element array is electrically connected to an FSS by using a feeding network.
Figure 10:
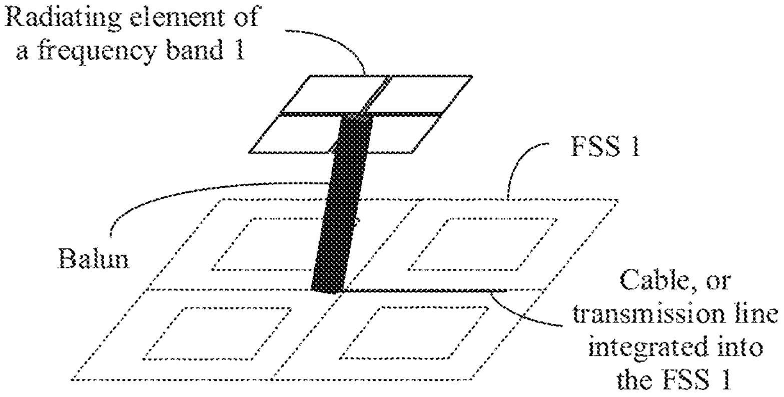
FIG. 10 is another schematic diagram in which a radiating element array is electrically connected to an FSS by using a feeding network.

FIG. 9 and FIG. 10 are two possible schematic diagrams in which the radiating element array of the frequency band 1 in the foregoing figures is electrically connected to the FSS 1 by using a feeding network. In FIG. 9, the radiating element array of the frequency band 1 is connected to the FSS 1 by using a cable, and a part of the cable is parallel to a plane in which the FSS 1 is located. In FIG. 10, the radiating element array of the frequency band 1 performs downward feeding by using a balun, the balun is connected to a cable, and is connected to the FSS by using the cable, and the cable is parallel to a plane in which the FSS 1 is located. This connection manner is easily implemented. The cable in each of FIG. 9 and FIG. 10 may alternatively be replaced with a transmission line integrated into the FSS 1. This is not limited in this embodiment of this application.

Optionally, the cable parallel to the FSS and the radiating element array of the frequency band 1 may be disposed on a same side of the FSS 1, or the cable parallel to the FSS and the radiating element array of the frequency band 1 may be distributed on two sides of the FSS 1, that is, the cable may pass through the FSS 1. This is not limited in this embodiment of this application.

In an optional embodiment, an electrical connection manner between the feeding network and the FSS is any one of a direct current connection manner, a coupling connection manner, or a segmented direct current connection manner.

Although that the feeding network is electrically connected to the FSS is used as an example for solution description in the foregoing embodiments, in another possible design, the feeding network may be integrated on the FSS.

Figure 11:
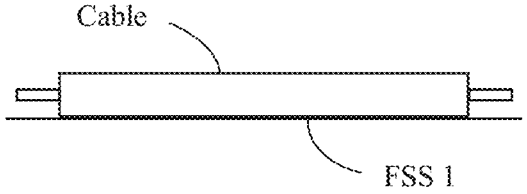
FIG. 11 is a schematic diagram of a direct current connection between a cable and an FSS.
Figure 12:
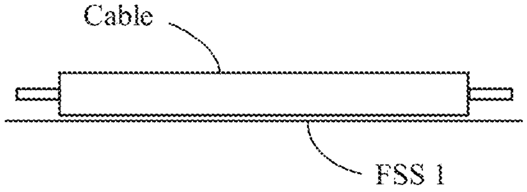
FIG. 12 is a schematic diagram of a coupling connection between a cable and an FSS.
Figure 13:
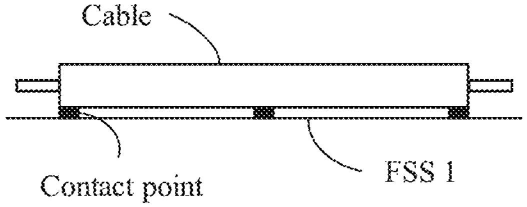
FIG. 13 is a schematic diagram of a segmented direct current connection between a cable and an FSS.
Figure 14:
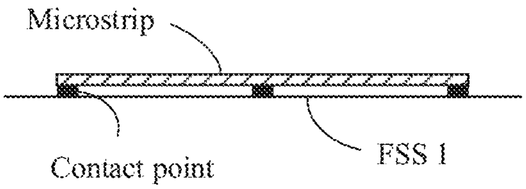
FIG. 14 is a schematic diagram of a coupling connection between a microstrip and an FSS.
Figure 15:
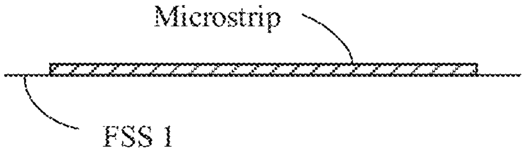
FIG. 15 is a schematic diagram of integration of a microstrip and an FSS.

The feeding network in this embodiment of this application may include a cable (as shown in FIG. 11 to FIG. 13), a microstrip (as shown in FIG. 14 and FIG. 15), or a transmission line in another form. This is not limited in this embodiment of this application. For example, the feeding network corresponding to the radiating element array of the frequency band 1 is electrically connected to the FSS 1. FIG. 11 is a schematic diagram of a direct current connection between a cable and the FSS 1, where the cable directly contacts the FSS 1. FIG. 12 is a schematic diagram of a coupling connection between a cable and the FSS 1, where a specific distance is kept between the cable and the FSS 1. FIG. 13 is a schematic diagram of a segmented direct current connection between a cable and the FSS 1, where the cable directly contacts the FSS 1 at a contact point. FIG. 14 is a schematic diagram of a segmented direct current connection between a microstrip and the FSS 1. FIG. 15 is a schematic diagram in which a microstrip is integrated into the FSS 1. Certainly, the microstrip and the FSS 1 may alternatively be in a direct current connection or a segmented direct current connection.

In an optional embodiment, in the plurality of radiating element arrays, a radiating element array located at an upper layer of a first FSS in the FSS and a radiating element array located at a lower layer of the first FSS are disposed in different radomes. It should be understood that the antenna system may include one layer of the FSS or a plurality of layers of the FSS. When the antenna system includes a plurality of layers of the FSS, the first FSS may be any one of the plurality of layers of the FSS, and is not intended to limit a protection scope of this embodiment of this application.

Figure 16:
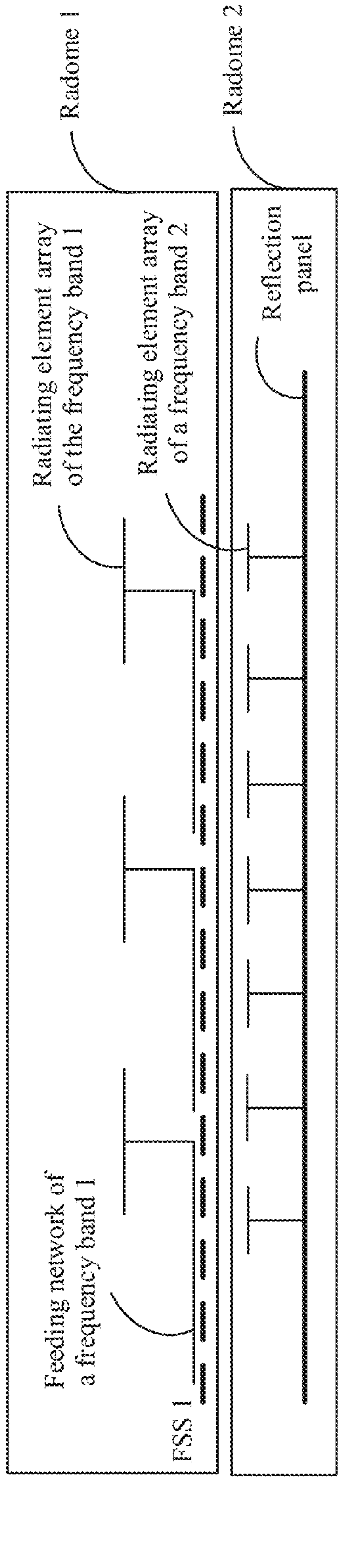
FIG. 16 is a schematic diagram of another multi-band antenna system according to an embodiment of this application.

For example, the first FSS is the FSS 1. In FIG. 16, the radiating element array of the frequency band 1 and the FSS 1 are located in a radome 1, and the radiating element array of the frequency band 2 is located in a radome 2. This is more conducive to antenna mounting and upgrading.

In another possible implementation, the multi-band antenna system may include more radomes to implement a protection function. This is not limited in this embodiment of this application.

The multi-band antenna system in this embodiment of this application may be used in a network device, and is configured to receive a signal and transmit a signal outward. For example, the multi-band antenna system in this embodiment of this application may be used in a base station.

Figure 17:
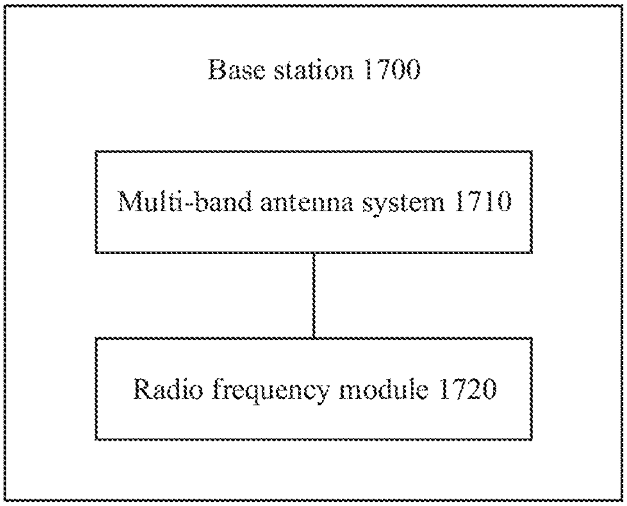
FIG. 17 is a schematic diagram of a base station according to an embodiment of this application.

FIG. 17 is a schematic block diagram of a base station according to an embodiment of this application. The base station 1700 shown in FIG. 17 includes a multi-band antenna system 1710 and a radio frequency module 1720, where the multi-band antenna system 1710 is connected to the radio frequency module 1720. The radio frequency module 1720 is configured to convert a baseband signal into a high-frequency current, and a radiating element array of the multi-band antenna system 1710 transmits a signal outward in a form of an electromagnetic wave. In addition, the radio frequency module 1720 may further convert a high-frequency current transmitted from the radiating element array of the multi-band antenna system 1710 (the radiating element array converts a received electromagnetic wave signal into a high-frequency current signal) into a baseband signal.

It should be understood that the multi-band antenna system 1710 may be the multi-band antenna system in each of FIG. 1 to FIG. 16. The base station can perform information transmission and exchange with a terminal device by using the multi-band antenna system 1710.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In embodiments provided in this application, it should be understood that the disclosed system, apparatus, and method may be implemented in other manners. For example, the described base station apparatus embodiment is merely an example. For example, division into the modules is merely logical function division and may be other division in actual implementation. For example, a plurality of modules or components may be combined or integrated into another system, or some features may be ignored or not performed. In addition, a displayed or discussed mutual coupling, direct coupling, or communication connection may be implemented through some interfaces, and indirect coupling or communication connection between apparatuses or modules may be in an electrical, mechanical, or another form.

The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of embodiments.

In addition, functional modules in embodiments of this application may be integrated into one processing unit, or each of the modules may exist alone physically, or two or more modules are integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A multi-band antenna system, comprising:

a plurality of radiating element arrays;

a plurality of feeding networks separately corresponding to the plurality of radiating element arrays;

a frequency selective surface (FSS); and a reflection panel, wherein:

the plurality of radiating element arrays are located above the reflection panel when the reflection panel is horizontally placed, and all or some of the plurality of radiating element arrays are stacked forming stacked radiating element arrays;

the FSS is located between the stacked radiating element arrays; and a feeding network corresponding to at least one radiating element array in the stacked radiating element arrays is electrically connected to the FSS according to an electrical connection manner, wherein the electrical connection manner is a direct current connection manner or a segmented direct current connection manner, or the feeding network corresponding to the at least one radiating element array is integrated on the FSS.

2. The multi-band antenna system according to claim 1, wherein the FSS comprises one layer.

3. The multi-band antenna system according to claim 1, wherein the FSS comprises a plurality of layers; and wherein:

that the feeding network corresponding to the at least one radiating element array in the stacked radiating element arrays is electrically connected to the FSS comprises: the feeding network corresponding to the at least one radiating element array in the stacked radiating element arrays is electrically connected to at least one layer of the plurality of layers of the FSS; or that the feeding network corresponding to the at least one radiating element array is integrated on the FSS comprises: the feeding network corresponding to the at least one radiating element array is integrated on at least one layer of the plurality of layers of the FSS.

4. The multi-band antenna system according to claim 1, wherein the FSS comprises a plurality of layers and at least two of the plurality of layers of the FSS are disposed adjacent to each other.

5. The multi-band antenna system according to claim 1, wherein the plurality of radiating element arrays comprise a first radiating element array and a second radiating element array, the first radiating element array corresponds to a first frequency band, the second radiating element array corresponds to a second frequency band, and the first frequency band is different from the second frequency band.

6. The multi-band antenna system according to claim 1, wherein the feeding network comprises a cable.

7. The multi-band antenna system according to claim 6, wherein at least a part of the cable is parallel to the FSS.

8. The multi-band antenna system according to claim 1, wherein the feeding network comprises a microstrip.

9. The multi-band antenna system according to claim 1, wherein the FSS comprises a first layer of the FSS, and in the plurality of radiating element arrays, a radiating element array located at an upper layer of the first layer of the FSS and a radiating element array located at a lower layer of the first layer of the FSS are respectively disposed in different radomes.

10. The multi-band antenna system according to claim 1, wherein the FSS comprises a first layer of the FSS, and radiating element arrays located at an upper layer of the first layer of the FSS comprise a plurality of radiating element arrays separately corresponding to at least two different frequency bands.

11. The multi-band antenna system according to claim 1, wherein the FSS comprises a first layer of the FSS, and radiating element arrays located at a lower layer of the first layer of the FSS comprise a plurality of radiating element arrays separately corresponding to at least two different frequency bands.

12. The multi-band antenna system according to claim 1, wherein at least one layer of the FSS is with a grid.

13. A base station, comprising a multi-band antenna system, and a radio frequency module connected to the multi-band antenna system, wherein the multi-band antenna system comprises:

a plurality of radiating element arrays;

a plurality of feeding networks separately corresponding to the plurality of radiating element arrays; a frequency selective surface (FSS); and a reflection panel, wherein:

the plurality of radiating element arrays are located above the reflection panel when the reflection panel is horizontally placed, and all or some of the plurality of radiating element arrays are stacked forming stacked radiating element arrays;

the FSS is located between the stacked radiating element arrays; and a feeding network corresponding to at least one radiating element array in the stacked radiating element arrays is electrically connected to the FSS according to an electrical connection manner, wherein the electrical connection manner is a direct current connection manner or a segmented direct current connection manner, or the feeding network corresponding to the at least one radiating element array is integrated on the FSS.

14. The base station according to claim 13, wherein the FSS comprises a plurality of layers; and wherein:

that the feeding network corresponding to the at least one radiating element array in the stacked radiating element arrays is electrically connected to the FSS comprises: the feeding network corresponding to the at least one radiating element array in the stacked radiating element arrays is electrically connected to at least one layer of the plurality of layers of the FSS; or that the feeding network corresponding to the at least one radiating element array is integrated on the FSS comprises: the feeding network corresponding to the at least one radiating element array is integrated on at least one layer of the plurality of layers of the FSS.

15. The base station according to claim 13, wherein the plurality of radiating element arrays comprise a first radiating element array and a second radiating element array, the first radiating element array corresponds to a first frequency band, the second radiating element array corresponds to a second frequency band, and the first frequency band is different from the second frequency band.

16. The base station according to claim 13, wherein the FSS comprises a first layer of the FSS, and in the plurality of radiating element arrays, a radiating element array located at an upper layer of the first layer of the FSS and a radiating element array located at a lower layer of the first layer of the FSS are respectively disposed in different radomes.

17. The base station according to claim 13, wherein the FSS comprises a first layer of the FSS, and radiating element arrays located at an upper layer of the first layer of the FSS comprise a plurality of radiating element arrays separately corresponding to at least two different frequency bands.

18. The base station according to claim 13, wherein the FSS comprises a first layer of the FSS, and radiating element arrays located at a lower layer of the first layer of the FSS comprise a plurality of radiating element arrays separately corresponding to at least two different frequency bands.

* * * * *